United States Patent
Motokado et al.

(10) Patent No.: US 10,661,454 B2
(45) Date of Patent: May 26, 2020

(54) ROBOT PROVIDED WITH WRIST INCLUDING HOLLOW MOVABLE ELEMENT AND HAVING WATERPROOF STRUCTURE

(71) Applicant: FANUC CORPORATION, Minamitsuru-gun, Yamanashi (JP)

(72) Inventors: Tomoyuki Motokado, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 598 days.

(21) Appl. No.: 15/264,991

(22) Filed: Sep. 14, 2016

(65) Prior Publication Data
US 2017/0072573 A1 Mar. 16, 2017

(30) Foreign Application Priority Data
Sep. 15, 2015 (JP) .................................. 2015-181617

(51) Int. Cl.
*B25J 19/00* (2006.01)
*B25J 17/02* (2006.01)

(52) U.S. Cl.
CPC ....... *B25J 19/0075* (2013.01); *B25J 17/0283* (2013.01); *B25J 19/0029* (2013.01)

(58) Field of Classification Search
CPC . B25J 19/0075; B25J 19/0029; B25J 19/0083
See application file for complete search history.

(56) References Cited

U.S. PATENT DOCUMENTS

| | | | | |
|---|---|---|---|---|
| 4,762,455 A | * | 8/1988 | Coughlan | ................... B25J 3/04 376/248 |
| 4,904,514 A | * | 2/1990 | Morrison | ............. B25J 19/0083 428/53 |
| 5,732,599 A | * | 3/1998 | Iriyama | ................ B25J 17/0241 74/490.02 |
| 5,823,060 A | * | 10/1998 | Ichibangase | ......... B25J 19/0029 74/490.02 |

(Continued)

FOREIGN PATENT DOCUMENTS

| | | |
|---|---|---|
| JP | S6263088 A | 3/1987 |
| JP | H02083192 A | 3/1990 |

(Continued)

OTHER PUBLICATIONS

Notification of Reasons for Refusal for Japanese Application No. 2015-181617, dated Aug. 3, 2017, including English translation, 8 pages.

*Primary Examiner* — Howard J Sanders
*Assistant Examiner* — Gregory T Prather
(74) *Attorney, Agent, or Firm* — RatnerPrestia

(57) ABSTRACT

A robot capable of preventing adhesion of a cutting fluid or the like on components thereof. The robot includes a robot arm, and a wrist connected to a distal end of the robot arm and including a plurality of movable elements connected to each other, and the movable elements being hollow elements, an end effector connected to a distal end of the wrist, a wire member laid to extend through the respective movable elements, and a cover to be mounted on the wrist so as to surround a connection between the two movable elements connected to each other.

6 Claims, 10 Drawing Sheets

(56) References Cited

U.S. PATENT DOCUMENTS

| | | | | |
|---|---|---|---|---|
| 6,039,068 A * | 3/2000 | Tessier | ............... | B25J 19/0079 137/377 |
| 6,042,624 A * | 3/2000 | Breyen | ............... | A61N 1/375 29/25.03 |
| 6,082,290 A * | 7/2000 | Conlin | ............... | B05B 13/0431 118/326 |
| 6,346,150 B1 * | 2/2002 | Conlin | ............... | B05B 13/0431 118/323 |
| 2004/0258877 A1 * | 12/2004 | D'Andreta | ........... | B25J 19/0075 428/99 |
| 2004/0261563 A1 | 12/2004 | Inoue et al. | | |
| 2005/0102037 A1 * | 5/2005 | Matsuda | ............. | B25J 15/0009 623/24 |
| 2006/0161138 A1 * | 7/2006 | Orban, III | ............ | B25J 19/0075 606/1 |
| 2006/0165953 A1 * | 7/2006 | Castelli | ............... | B25J 19/0058 428/99 |
| 2008/0237921 A1 * | 10/2008 | Butterworth | ............ | B08B 17/04 264/241 |
| 2010/0292707 A1 * | 11/2010 | Ortmaier | ............. | B25J 19/0075 606/130 |
| 2011/0162477 A1 * | 7/2011 | Kim | ............ | B25J 9/06 74/490.05 |
| 2013/0011234 A1 * | 1/2013 | Pretlove | ............. | B25J 5/005 414/749.1 |
| 2014/0020498 A1 * | 1/2014 | Adachi | ............. | B25J 19/0029 74/490.02 |
| 2014/0216334 A1 * | 8/2014 | D'Andreta | ......... | B05B 13/0431 118/504 |
| 2015/0174771 A1 * | 6/2015 | Fujita | ............. | B25J 19/06 700/258 |
| 2015/0374445 A1 * | 12/2015 | Gombert | ............. | B25J 15/0206 606/130 |
| 2017/0290632 A1 * | 10/2017 | Nakatsu | ............. | A61B 34/35 |
| 2017/0348063 A1 * | 12/2017 | Braun | ............. | A61B 34/30 |
| 2018/0200014 A1 * | 7/2018 | Bonny | ............. | B25J 19/0079 |
| 2018/0207795 A1 * | 7/2018 | Haddadin | ............. | B25J 9/0009 |

FOREIGN PATENT DOCUMENTS

| | | |
|---|---|---|
| JP | 2003200376 A | 7/2003 |
| JP | 2004299002 A | 10/2004 |
| JP | 2005014159 A | 1/2005 |
| JP | 2010221355 A | 10/2010 |
| JP | 2013111716 A | 6/2013 |
| JP | 2014100753 A | 6/2014 |
| JP | 2015-003374 | 1/2015 |

* cited by examiner

//patents.google.com/patent/US10661454B2

ROBOT PROVIDED WITH WRIST INCLUDING HOLLOW MOVABLE ELEMENT AND HAVING WATERPROOF STRUCTURE

BACKGROUND

1. Field of the Invention

The present invention relates to a robot provided with a wrist including a hollow movable element and having a waterproof structure.

2. Description of the Related Art

A technique of covering a robot hand of a robot with a cover in order to improve waterproofness of the robot hand is known (For example, Japanese Laid-open Patent Publication No. 2015-003374).

In the field of an industrial robot, a robot, which is able to advance and retract from the inside of a machine tool so as to carry a workpiece into and from the machine tool, is widely employed.

In such a machine tool, a highly corrosive cutting fluid may be used, which may damage components of the robot (e.g., a wire member including an electric cable). Therefore, in such a robot, a technique for preventing a cutting fluid from adhering to the components of the robot is required.

SUMMARY OF INVENTION

In an aspect of the invention, a robot includes a robot arm, and a wrist connected to a distal end of the robot arm and including a plurality of movable elements movably connected to each other. Each of the movable elements is hollow.

The robot further includes an end effector connected to a distal end of the wrist, a wire member laid so as to extend through the respective movable elements, and a cover mounted on the wrist so as to surround a connection between two of the movable elements connected to each other.

The wrist may include a first movable element connected to the distal end of the robot arm so as to be rotatable about a first axis, and a second movable element connected to a distal end of the first movable element so as to be rotatable about a second axis which is orthogonal to the first axis. The cover may surround the connection between the first movable element and the second movable element.

The first movable element may include a first hollow part connected to the distal end of the robot arm so as to be rotatable about the first axis, and a first extension part extending from the first hollow part. The second movable element may include a second hollow part and a second extension part extending from the second hollow part. The second extension part may be connected to a distal end of the first extension part so as to be rotatable about the second axis.

The wire member may be laid so as to extend through the first hollow part and the second hollow part. The cover may extend between the first hollow part and the second hollow part. The cover may surround a connection between the first extension part and the second extension part. Further, the cover may surround the wire member extending between the first hollow part and the second hollow part.

The wrist may further include a third movable element connected to the second movable element so as to be opposite to the first movable element and to be rotatable about a third axis which is orthogonal to the second axis. The end effector may be fixed to a distal end of the third movable element. The cover may surround the connection between the second movable element and the third movable element.

The robot may further include a first seal member which liquid-tightly seals the inside of the movable element through which the wire member extends. The end effector may include a hole which receives the wire member extending out from the movable element of the wrist. The robot may further include a second seal member which liquid-tightly seals the hole.

BRIEF DESCRIPTION OF DRAWINGS

The above-mentioned or other objects, features, and advantages of the invention will be clarified by the following description of preferred embodiments with reference to the accompanying drawings, in which.

DETAILED DESCRIPTION

Figure 1:
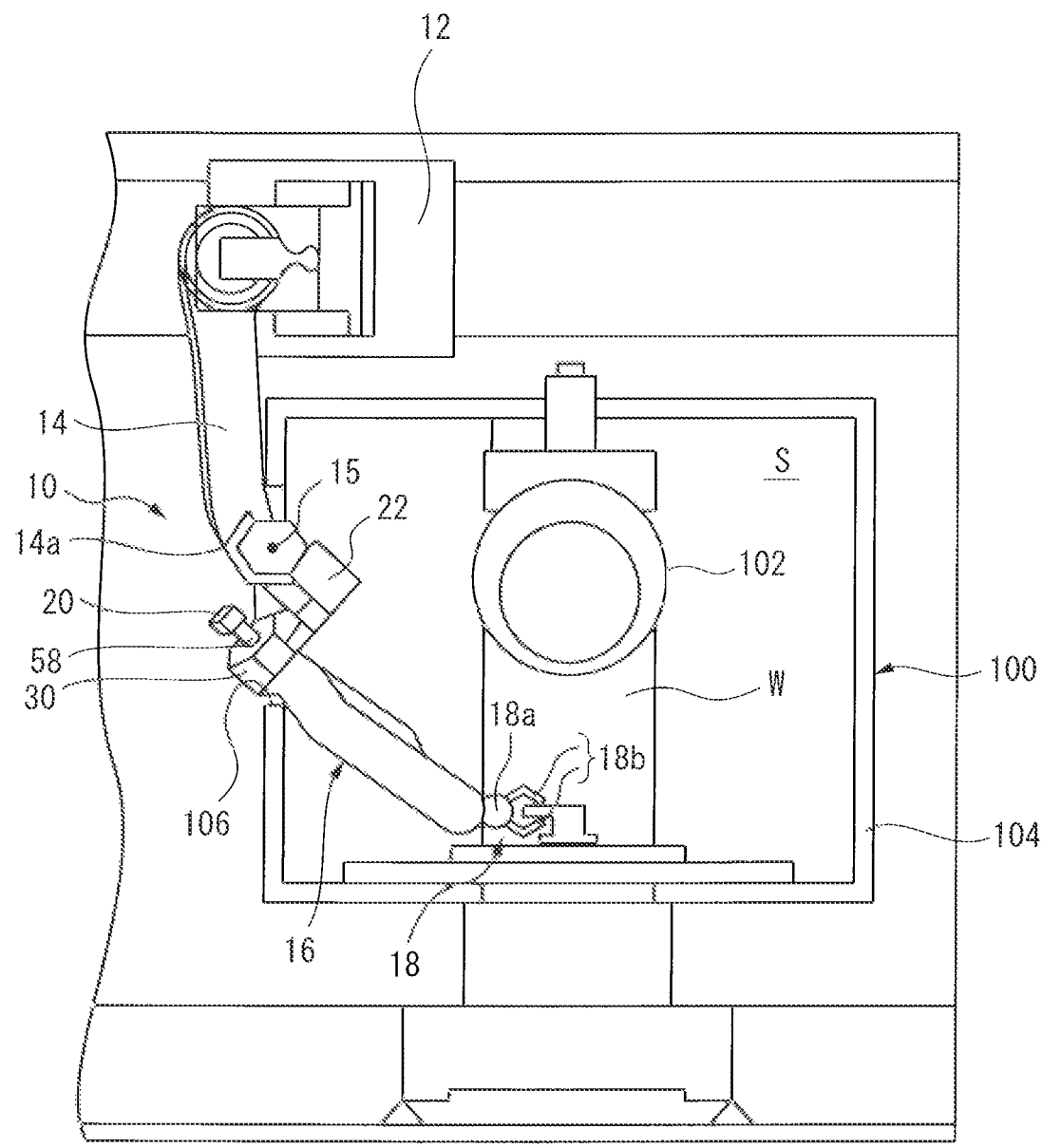
FIG. 1 is a view of a robot and a processing machine according to an embodiment of the invention.

Referring to the drawings, embodiments of the invention will be described in detail below. First, referring to FIG. 1, a robot 10 according to an embodiment of the invention will be described. The robot 10 is for carrying a workpiece W into and out from an internal space S of a processing machine 100.

The processing machine 100 includes a process shaft 102, and a fence 104 which defines the internal space S in which the process shaft 102 is placed. The process shaft 102 machines the workpiece W placed in the internal space S.

The fence 104 is provided with an opening 106 at which an openable and closable door (not shown) is provided. The robot 10 can advance into and retract from the internal space S when the door is opened.

The robot 10 is e.g. a vertical articulated robot, and includes a base 12, a robot arm 14, a wrist 16, and an end effector 18. The base 12 is fixed to a gantry. The robot arm 14 is rotatably connected to the base 12.

The wrist 16 is rotatably connected to a distal end 14a of the robot arm 14. The wrist 16 supports the end effector 18 so as to be rotatable about three axes with respect to the robot arm 14. The wrist 16 will be described in detail later.

In this embodiment, the end effector 18 is a robot hand able to grip and release the workpiece W. The end effector 18 includes a base 18a fixed to a distal end of the wrist 16 (corresponding to a distal end 28a of the third movable element 28 described later), and a pair of claws 18b mounted at the base 18a so as to be movable in directions toward and away from each other.

The base 18a is formed with a hole 18c (FIG. 5D) which receives a wire member 58 described later for introducing the wire member 58 into the end effector 18. The end effector 18 is advanced into and retracted from the internal space S by the robot arm 14 when the door 104 is opened.

Next, referring to FIG. 2 to FIG. 4, the wrist 16 will be described. The wrist 16 is connected to a casing 22, and includes a first movable element 24, a second movable element 26, and a third movable element 28.

The casing 22 is connected to the distal end 14a of the robot arm 14 so as to be rotatable about an arm axis 15 (FIG. 1), and includes a hollow part 30. The hollow part 30 is formed with a through hole 32 extending through the hollow part 30 along a first axis rotatable about the arm axis 15.

The first movable element 24 is connected to the hollow part 30 of the casing 22 so as to be rotatable about the first axis 34. The first movable element 24 includes a (first) hollow part 36 and a (first) extension part 38.

The hollow part 36 extends from a distal end 30a of the hollow part 30 of the casing 22 along the first axis 34. A through hole 40 extending through the hollow part 36 along the first axis 34 is formed at a center of the hollow part 36. The through hole 40 is in fluid communication with the through hole 32 formed at the casing 22.

The extension part 38 is a solid plate member extending out from a distal end 36a of the hollow part 36 along the first axis 34. The extension part 38 includes a first part 42 and a second part 44. The first part 42 is fixed to the distal end 36a of the hollow part 36. The second part 44 extends out from a distal end 42a of the first part 42 along the first axis 34. The second part 44 is thinner than the first part 42.

The first movable element 24 is driven to rotate by a first drive part 25 (FIG. 4) housed in the casing 22. The first drive part 25 includes a servo motor and a first reducer connected to an output shaft of the servo motor.

The second movable element 26 is connected to a distal end 44a of the second part 44 of the first movable element 24 so as to be rotatable about a second axis 46. The second axis 46 is orthogonal to the first axis 34, and rotates about the first axis 34.

The second movable element 26 includes a (second) hollow part 48 and a (second) extension part 50. A through hole 54 extending through the hollow part 48 is formed at a center of the hollow part 48. The through hole 54 extends along a third axis 52 which is orthogonal to the second axis 46 and which rotates about the second axis 46.

The extension part 50 is a plate member extending out from a proximal end 48a of the hollow part 48, and is connected to the distal end 44a of the second part 44 of the first movable element 24 so as to be rotatable about the second axis 46.

The second movable element 26 is driven to rotate by a second drive part 27 (FIG. 4) mounted on the extension part 38 of the first movable element 24. The second drive part 27 includes a servo motor and a second reducer connected to an output shaft of the servo motor.

The third movable element 28 is arranged inside of the hollow part 48 of the second movable element 26 so as to be rotatable about the third axis 52. The third movable element 28 is a cylindrical member, and is formed with a through hole 56 (FIG. 5C) extending through the third movable element 28 along the third axis 52 at a center part of the third movable element 28. The through hole 56 is in fluid communication with the through hole 54 formed at the second movable element 26.

The third movable element 28 is driven to rotate by a third drive part 29 (FIG. 4) mounted on the hollow part 48 of the second movable element 26. The third drive part 29 includes a servo motor and a third reducer connected to an output shaft of the servo motor.

A control box 20 is attached to the casing 22, and houses therein various control devices for operating the end effector 18. For example, the control box 20 houses a control device which controls a pressure of a compressed fluid for moving the claws 18b of the end effector 18.

The end effector 18 is fixed to the distal end 28a of the third movable element 28. The end effector 18 is rotated by the action of the wrist 16 about the first axis 34, the second axis 46, and the third axis 52.

The robot 10 further includes the wire member 58 and a cover 60. In this embodiment, the wire member 58 is connected to each control device housed in the control box 20 at one end thereof, and connected to the end effector 18 at the other end thereof.

The wire member 58 lead out from the control box 20 is laid so as to extend through the through hole 32 of the casing 22, the through hole 40 of the first movable element 24, the through hole 54 of the second movable element 26 and the through hole 56 of the third movable element 28, and to be introduced into the base 18a of the end effector 18. The wire member 58 is exposed to the outside of the first and second movable elements 24 and 26 at an area between the through hole 40 of the first movable element 24 and the through hole 54 of the second movable element 26.

Figure 5A:
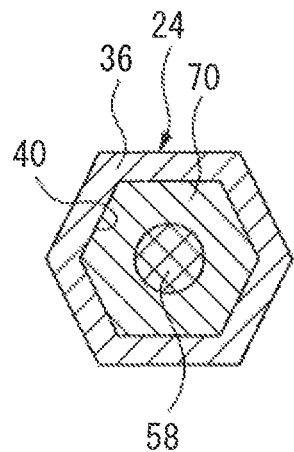
FIG. 5A is a cross-sectional view along the line V(a)-V(a) in FIG. 4.

In this embodiment, as shown in FIG. 5A, a (first) seal member 70 for liquid-tightly sealing the through hole 40 of the first movable element 24 through which the wire member 58 extends is inserted into the through hole 40.

Figure 5B:
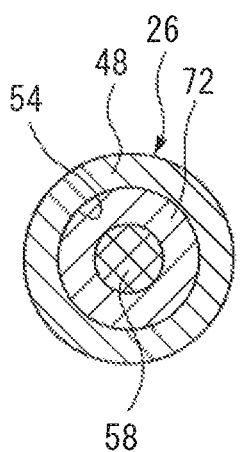
FIG. 5B is a cross-sectional view along the line V(b)-V(b) in FIG. 4.
Figure 5C:
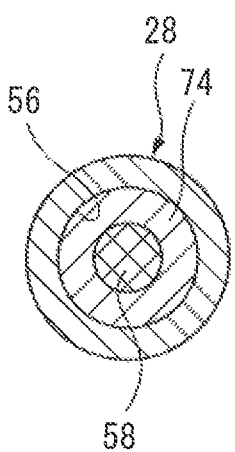
FIG. 5C is a cross-sectional view along the line V(c)-V(c) in FIG. 4.

Further, as shown in FIG. 5B, a (first) seal member 72 for liquid-tightly sealing the through hole 54 of the second movable element 26 is inserted into the through hole 54. Further, as shown in FIG. 5C, a (first) seal member 74 for liquid-tightly sealing the through hole 56 of the third movable element 28 is installed in the through hole 56.

Figure 5D:
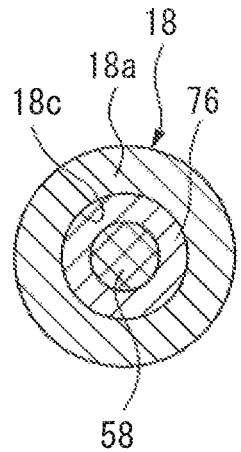
FIG. 5D is a cross-sectional view along the line V(d)-V(d) in FIG. 4.

Further, as shown in FIG. 5D, a second seal member 76 for liquid-tightly sealing the hole 18c formed at the base 18a of the end effector is installed in the hole 18c.

The cover 60 is a flexible tubular member having a first open end 62 and a second open end 64 opposite the first open end. The cover 60 is comprised of e.g. a fibrous material superior in corrosion resistance property. Note that, in FIG. 2 to FIG. 4, the cover 60 is indicated by a dot line for the sake of easy understanding.

In this embodiment, the first open end 62 is arranged between the hollow part 30 of the casing 22 and the distal end 36a of the hollow part 36 of the first movable element 24, and surrounds an outer surface of the hollow part 36 of the first movable element 24. On the other hand, the second open end 64 is arranged in a gap 66 (FIG. 4) formed between the distal end 48b of the hollow part 48 of the second movable element 26 and the end effector 18, and is arranged so as to surround the wire member 58.

In this manner, the cover 60 is mounted on the wrist 16 so as to surround a part of the hollow part 36 of the first movable element 24, the extension part 38, the whole of the second movable element 26, and a part of the third movable element 28.

Thus, the cover 60 extends between the hollow part 36 of the first movable element 24 and the hollow part 48 of the second movable element 26 so as to surround a connection between the extension part 38 of the first movable element 24 and the extension part 50 of the second movable element 26.

In addition, the cover 60 surrounds a connection between the hollow part 48 of the second movable element 26 and the third movable element 28. In this manner, the part of the wire member 58, which is exposed to the outside at the area between the through hole 40 of the first movable element 24 and the through hole 54 of the second movable element 26, is covered by the cover 60 mounted on the wrist 16 as stated above.

Figure 6:
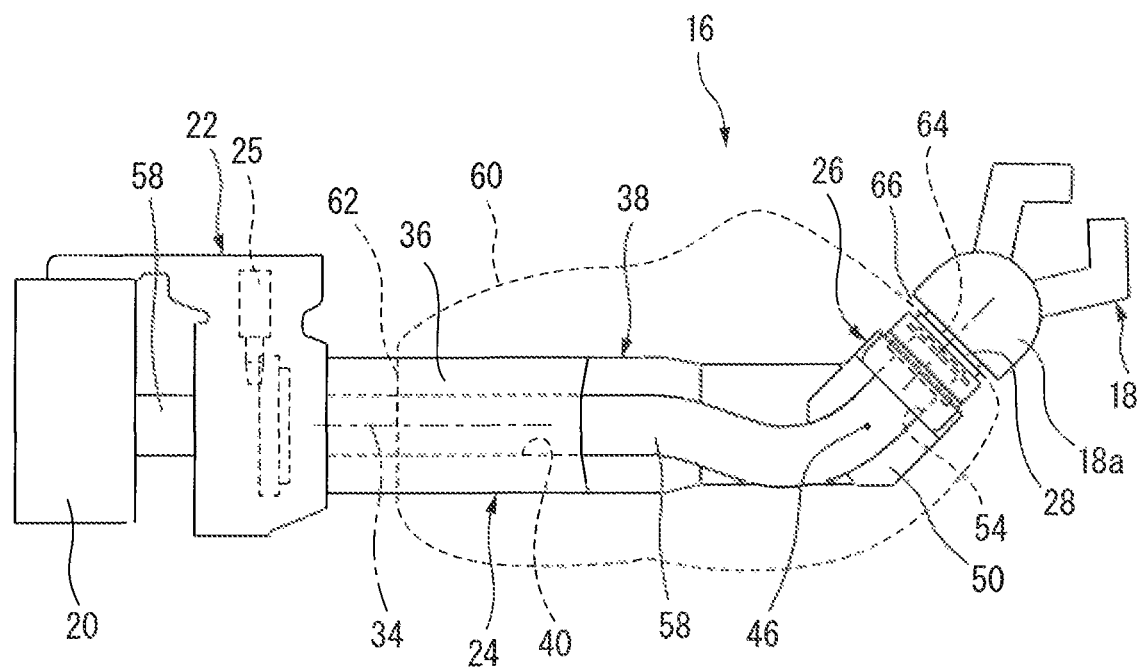
FIG. 6 shows a state in which the second movable element of the robot shown in FIG. 4 is rotationally moved relative to the first movable element.

FIG. 6 illustrates a state in which the second movable element 26 is rotated about the second axis 46 with respect to the first movable element 24 by a predetermined angle. In this embodiment, the wire member 58 is wired so as to be exposed to the outside at the area between the through hole 40 of the first movable element 24 and the through hole 54 of the second movable element 26.

Therefore, when the second movable element 26 rotates as shown in FIG. 6, the wire member 58 extending out from the through hole 40 is bent in the area between the through hole 40 and the through hole 54, and is introduced into the through hole 54.

Further, the cover 60 is comprised of a flexible member, as descried above. Therefore, even if the second movable element 26 rotates as shown in FIG. 6, the cover 60 can deform in response to the rotation of the second movable element 26 without fracture.

Due to the cover 60 thus mounted on the wrist 16, it is possible to prevent foreign substances, such as cutting fluid present in the internal space S, from entering inside of the wrist 16 through the connections between two of the movable element 24, 26 and 28, when carrying the workpiece W into and out from the internal space S.

Accordingly, in a case where a corrosive cutting fluid is used, it is possible to prevent the components of the wrist 16 and the wire member 58 from being damaged by the cutting fluid entering inside of the wrist 16.

Further, in this embodiment, the cover 60 is mounted so as to surround the components of the wrist 16 over an area from the hollow part 36 of the first movable element 24 to the distal end 28a of the third movable element 28.

According to this configuration, it is possible to reliably cover the part of the wire member 58, which is exposed to the outside at the area between the through hole 40 of the first movable element 24 and the through hole 54 of the second movable element 26, by the cover 60. Therefore, the wire member 58 can be effectively protected from foreign substances such as a cutting fluid.

Note that, the first open end 62 and the second open end 64 may be comprised of e.g. an elastic rubber ring. In this case, since the inside of the cover 60 may be sealed at the first and second open ends 62 and 64, it is possible to effectively prevent foreign substances such as a cutting fluid from entering into the cover 60.

Further, in this embodiment, the through hole 40, the through hole 54, the through hole 56, and the hole 18c are respectively sealed by the seal member 70, the seal member 72, the seal member 74, and the seal member 76. Accordingly, it is possible to reliably prevent foreign substances such as a cutting fluid from entering into these holes 40, 54, 56, and 18c.

Figure 7:
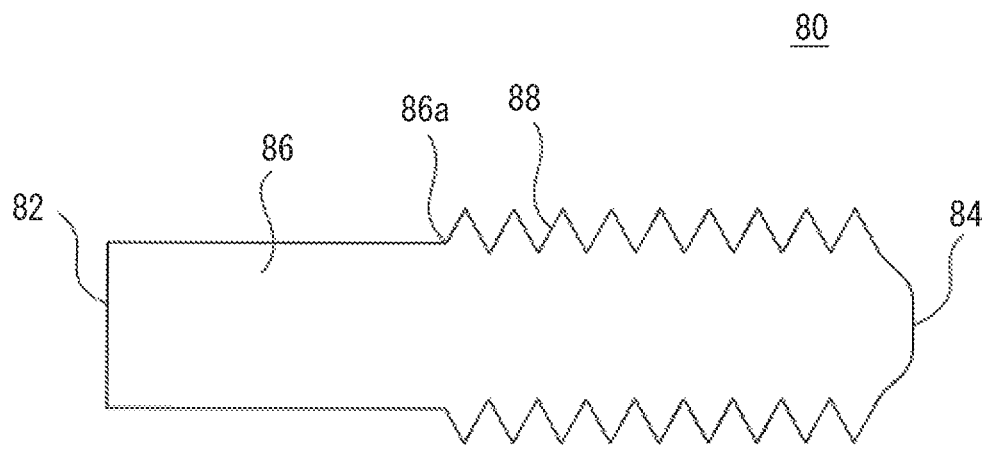
FIG. 7 is a side view of a cover according to another embodiment.

Next, referring to FIG. 7 and FIG. 8, a cover 80 according to another embodiment will be described. The cover 80 is a tubular member, and includes a first open end 82 and a second open end 84 opposite the first open end 82.

The cover 80 includes a cylindrical part 86 having the first open end 82, and a bellows part 88 extending from a distal end 86a of the cylindrical part 86 and having the second open end 84. For example, the bellows part 88 has a higher flexibility than the cylindrical part 86, and therefor can be bent in a given direction more easily than the cylindrical part 86.

Figure 4:
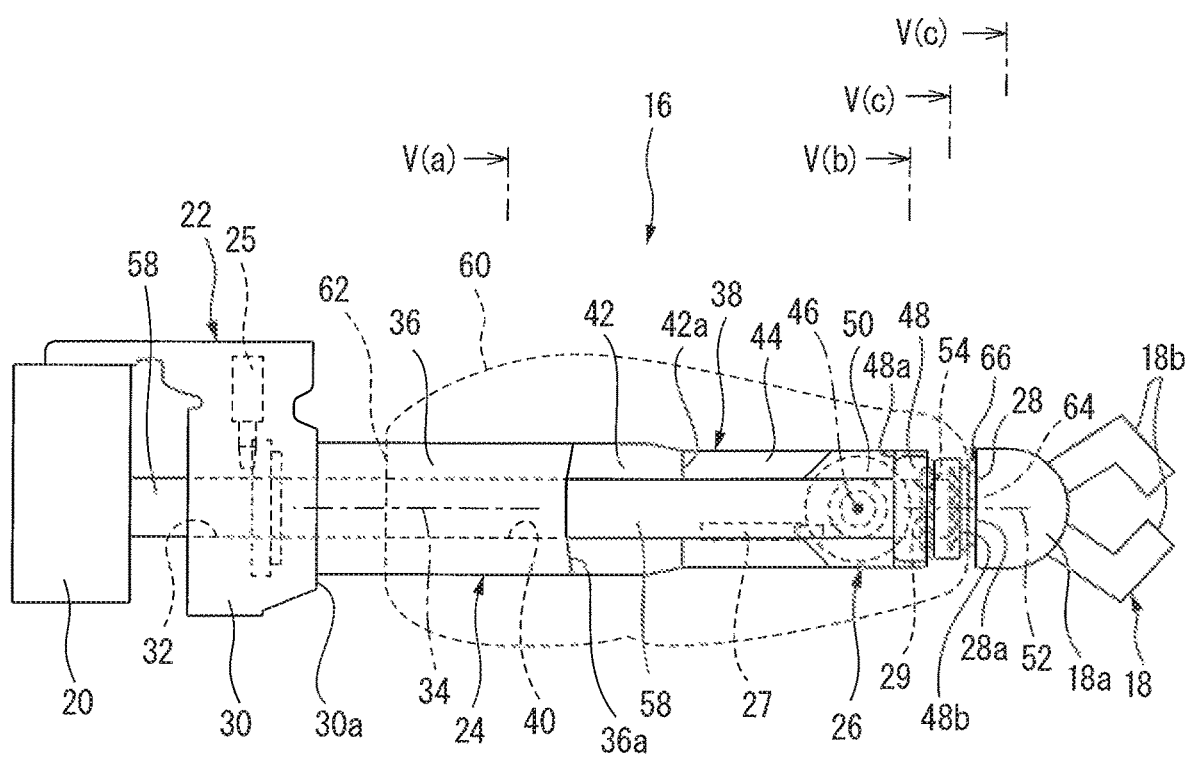
FIG. 4 is a side view of the wrist and the end effector of the robot shown in FIG. 2.
Figure 8:
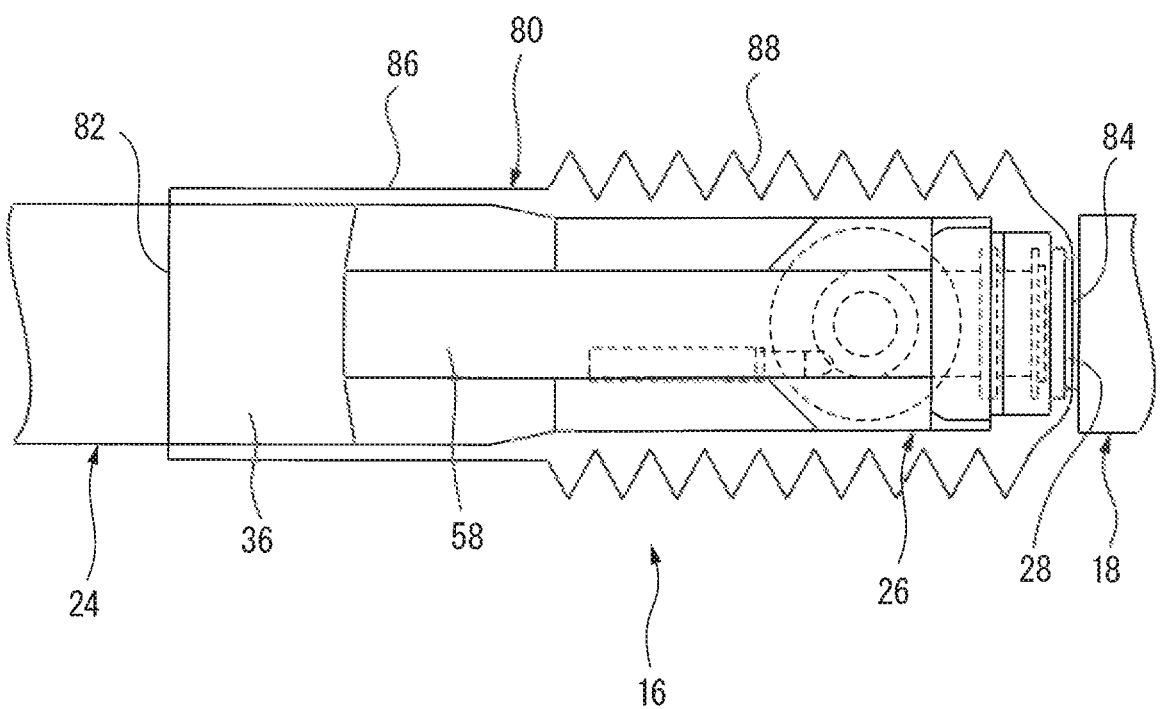
FIG. 8 shows a state in which the cover shown in FIG. 7 is mounted on the wrist shown in FIG. 4.

FIG. 8 shows that the cover 80 according to this embodiment is mounted on the wrist 16 shown in FIG. 4. As shown in FIG. 8, when the cover 80 is mounted on the wrist 16, the first open end 82 is arranged so as to surround the outer surface of the hollow part 36 of the first movable element 24. On the other hand, the bellows part 88 is arranged so as to surround the connection between the first movable element 24 and the second movable element 26.

In the cover 80 according to this embodiment, when the second movable element 26 rotates relative to the first movable element 24 as shown in FIG. 6, the bellows part 88 can be flexibly bent in response to the rotation of the second movable element 26. Accordingly, since it is possible to avoid a stress from being generated at the cover 80 due to the rotation of the second movable element 26, the components of the wrist 16 and the wire member 58 can be protected from foreign substances such as a cutting fluid, along with reliably preventing the fracture of the cover.

Note that, in the above-descried embodiments, the covers 60 and 80 extend from the hollow part 36 of the first movable element 24 to the distal end 28a of the third movable element 28. However, the cover may be mounted so as to just surround the connection between the two movable elements connected to each other.

Figure 9:
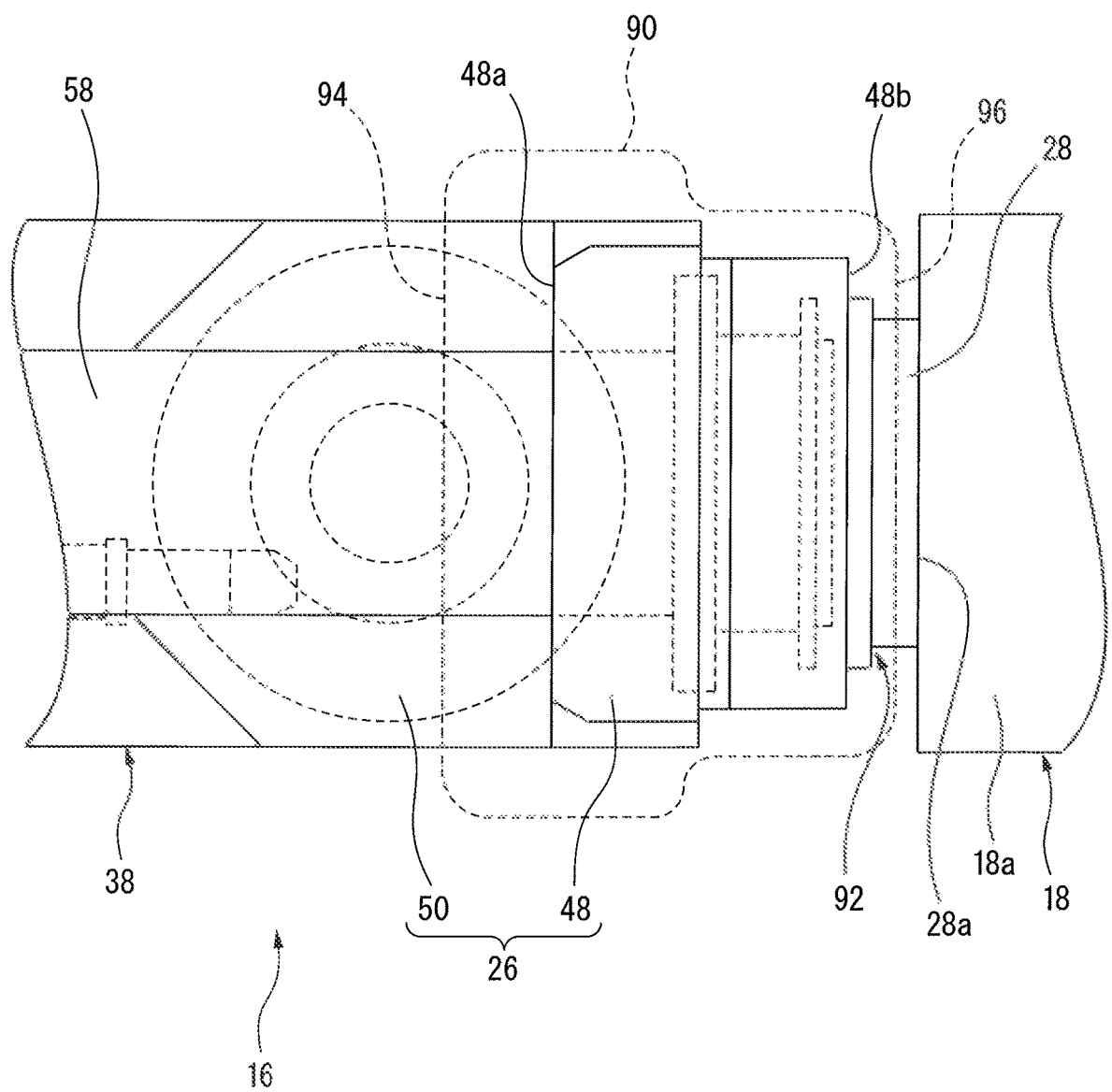
FIG. 9 is a view of a cover according to still another embodiment, in which the cover is mounted on the wrist shown in FIG. 4.
Figure 10:
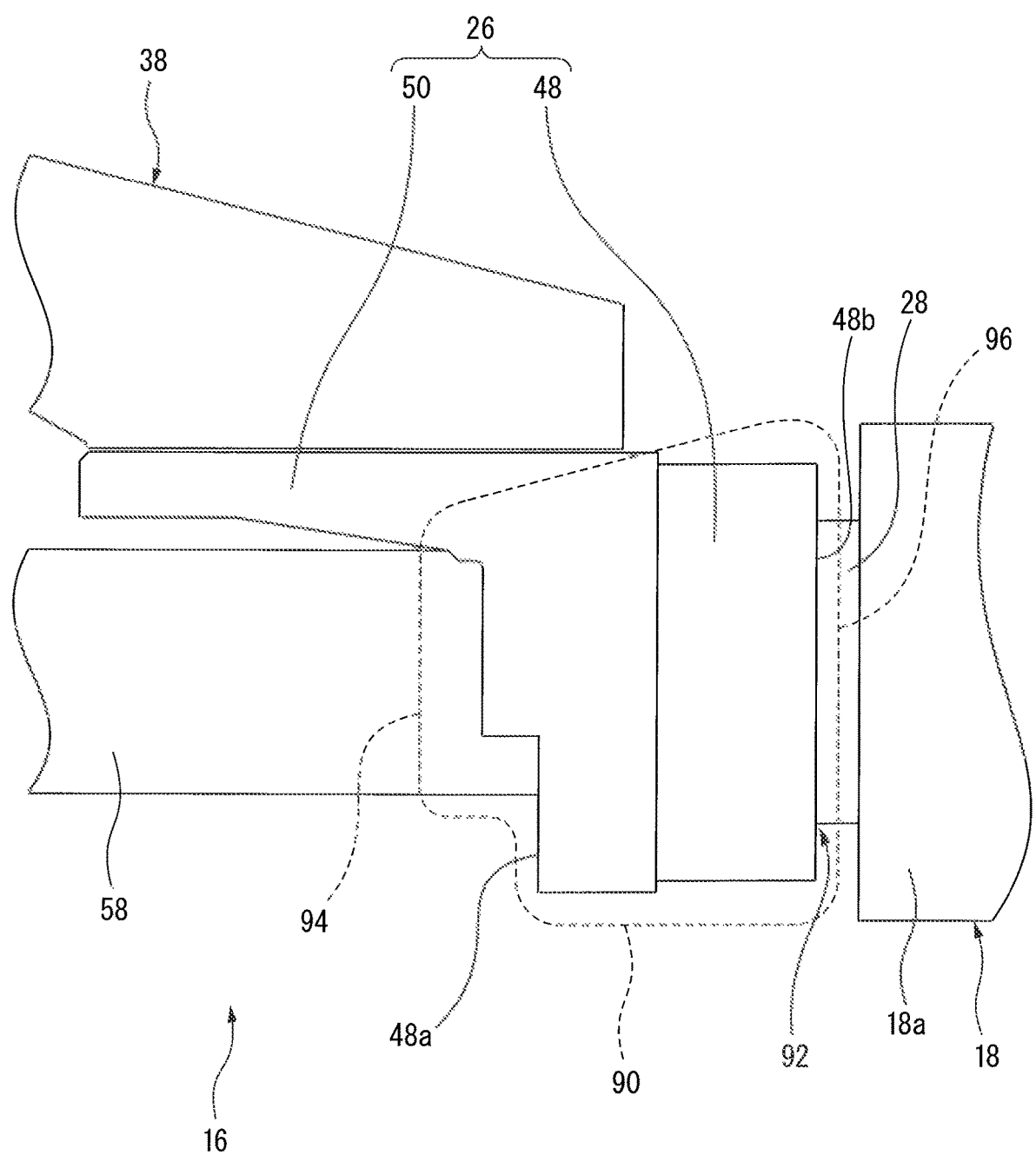
FIG. 10 is a side view of the wrist shown in FIG. 9 when viewed from upper side of FIG. 9.

As an example, FIG. 9 and FIG. 10 show a cover 90 mounted so as to surround a connection 92 between the second movable element 26 and the third movable element 28 of the above-mentioned wrist 16. Note that, in FIG. 9 and FIG. 10, the cover 90 is indicated by a dot line for the sake of easy understanding.

The cover 90 is a tubular member, and includes a first open end 94 and a second open end 96 opposite the first open end 94. The first open end 94 is arranged so as to surround the extension part 50 of the second movable element 26, while the second open end 96 is arranged so as to surround the third movable element 28.

According to the cover 90 of this embodiment, it is possible to prevent foreign substances such as a cutting fluid from entering inside of the wrist 16 through the connection 92 which is closer to the end effector 18. Therefore, the wire member 58 extending through the second movable element 26 and the third movable element 28 can be protected from the foreign substances.

Figure 11:
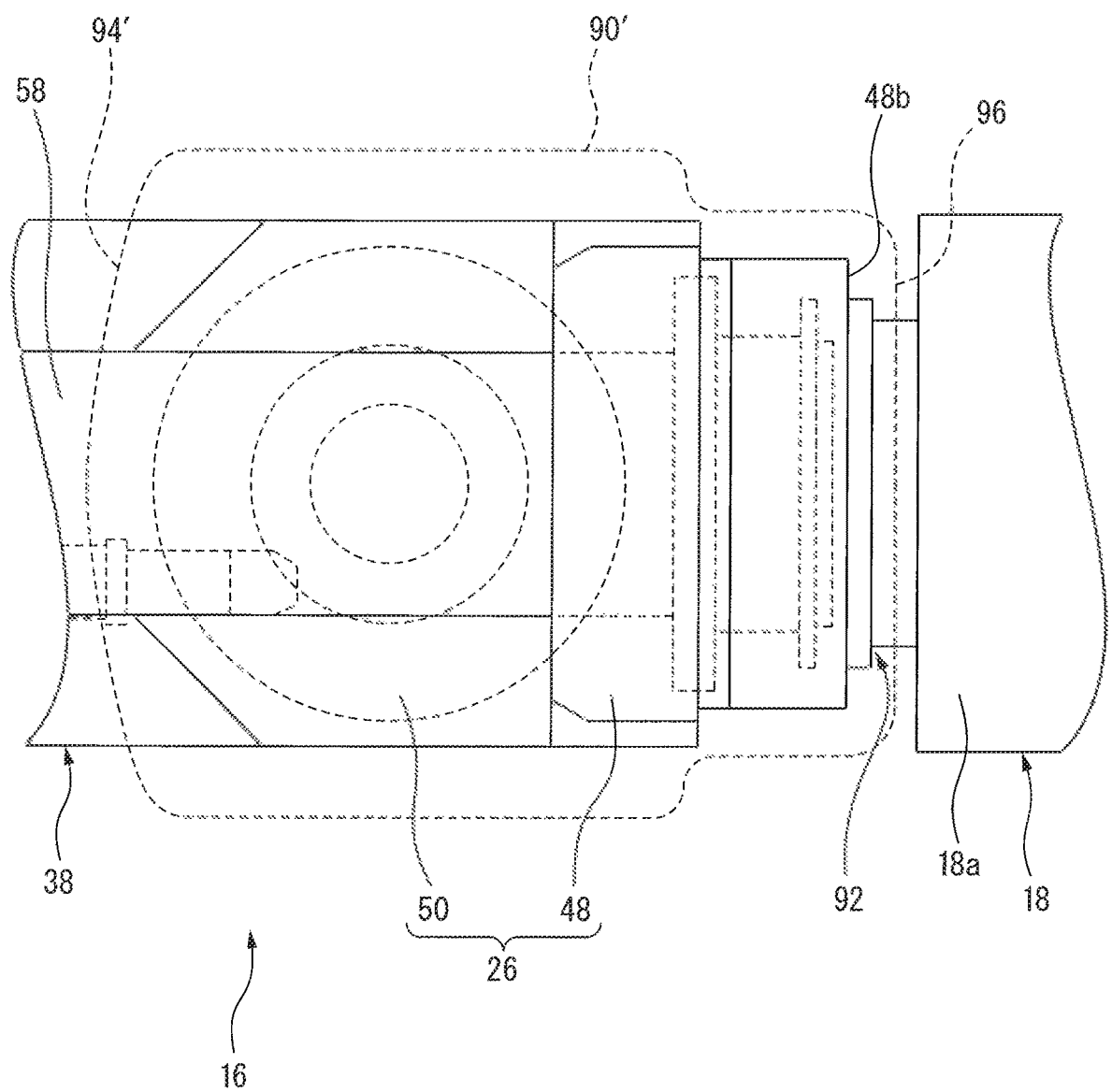
FIG. 11 is a view of a cover according to still another embodiment, in which the cover is mounted on the wrist shown in FIG. 4.
Figure 12:
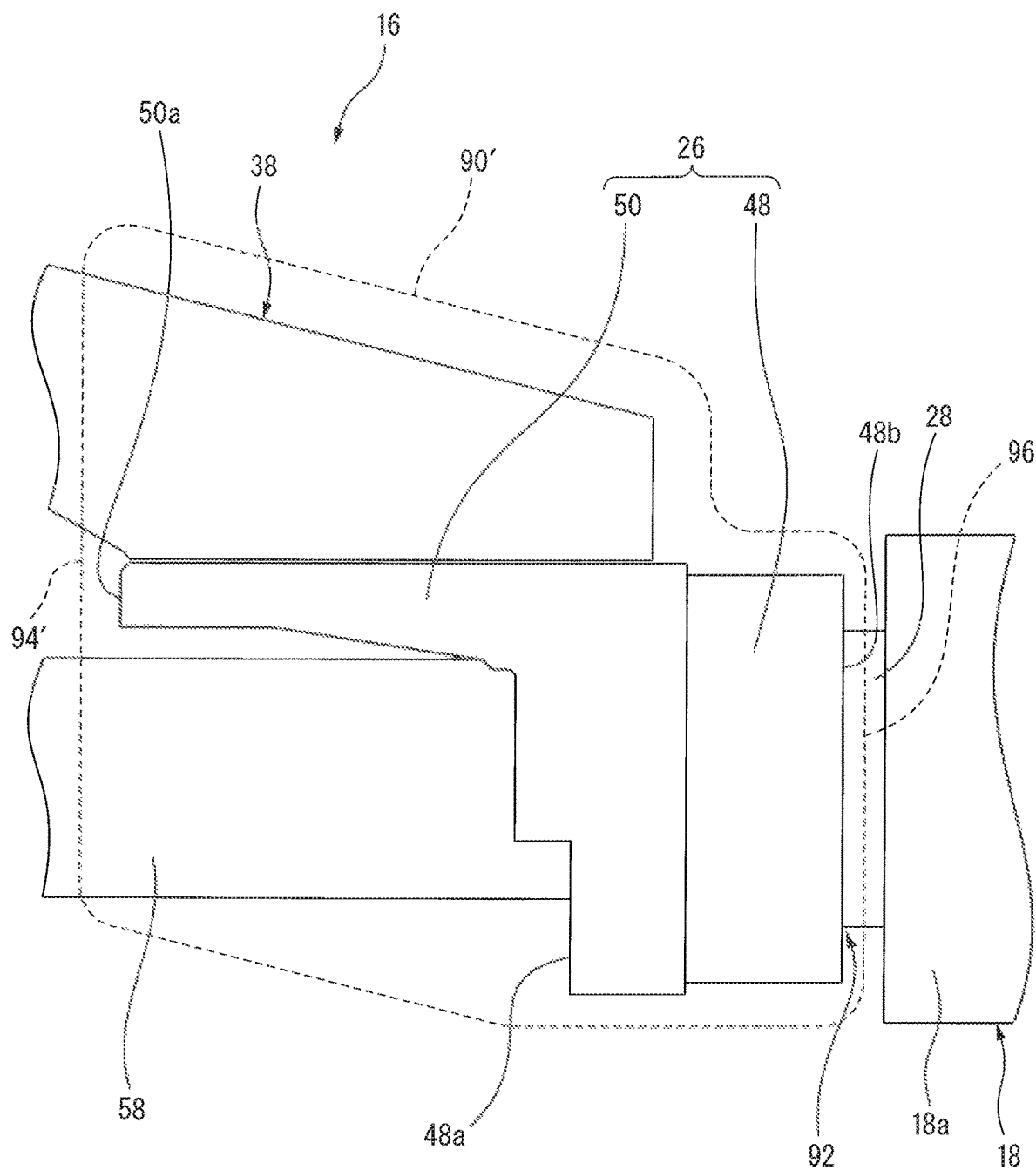
FIG. 12 is a side view of the wrist shown in FIG. 11 when viewed from upper side of FIG. 11.

The above-mentioned cover 90 may be configured so as to surround the entirety of the second movable element 26. Such a variation of the cover 90 is shown in FIG. 11 and FIG. 12. In a cover 90' shown in FIG. 11 and FIG. 12, a first open end 94' of the cover 90' is arranged between the distal end 36a of the hollow part 36 of the first movable element 24 and a proximal part 50a (FIG. 12) of the extension part 50 of the second movable element 26.

Thus, the cover 90' surrounds the entirety of the second movable element 26 in addition to the above-descried connection 92. According to this configuration, it is possible to prevent foreign substances such as a cutting fluid from entering inside of the wrist 16 through the connection 92 closer to the end effector 18 and through the proximal end 48a of the hollow part 48 of the second movable element 26. In addition, the second movable element 26 can be protected from the foreign substances.

In the above-mentioned embodiments, the end effector 18 is a robot hand. However, the end effector 18 may be e.g. a welding torch capable of welding the workpiece W. In this case, the wire member 58 includes a welding cable and a conduit.

Figure 2:
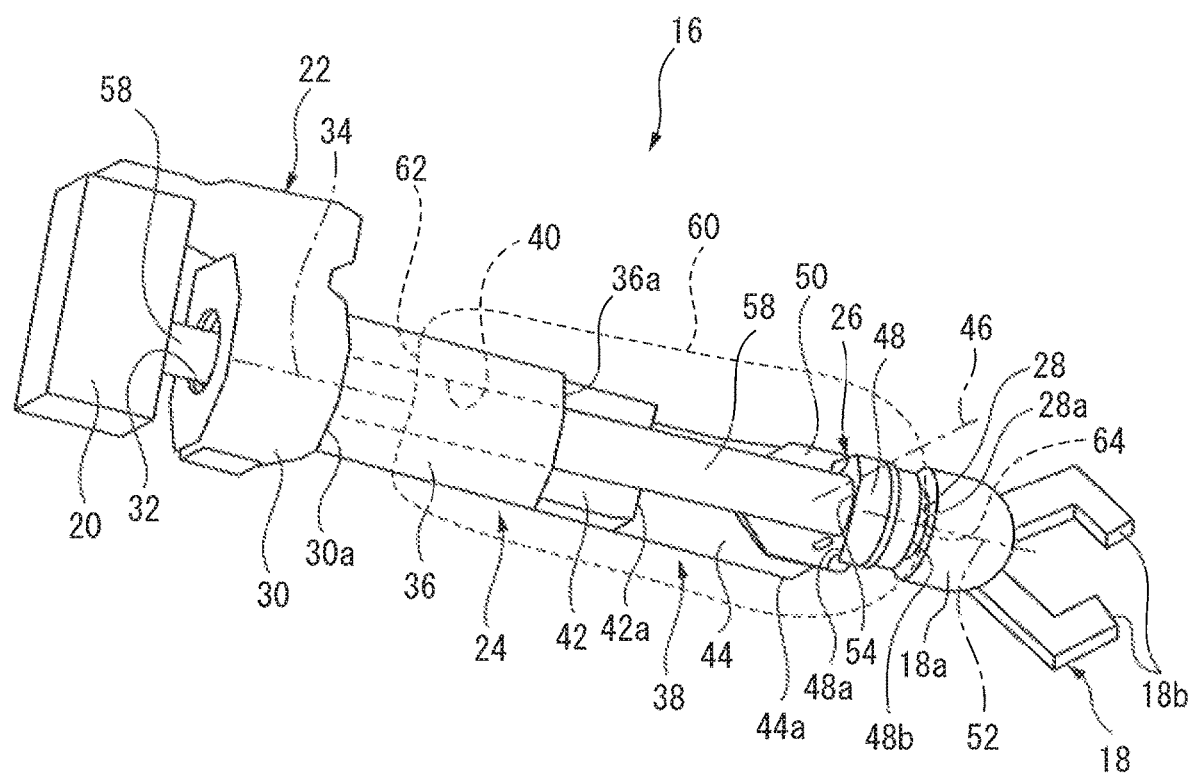
FIG. 2 is a perspective view of a wrist and an end effector of the robot shown in FIG. 1.
Figure 3:
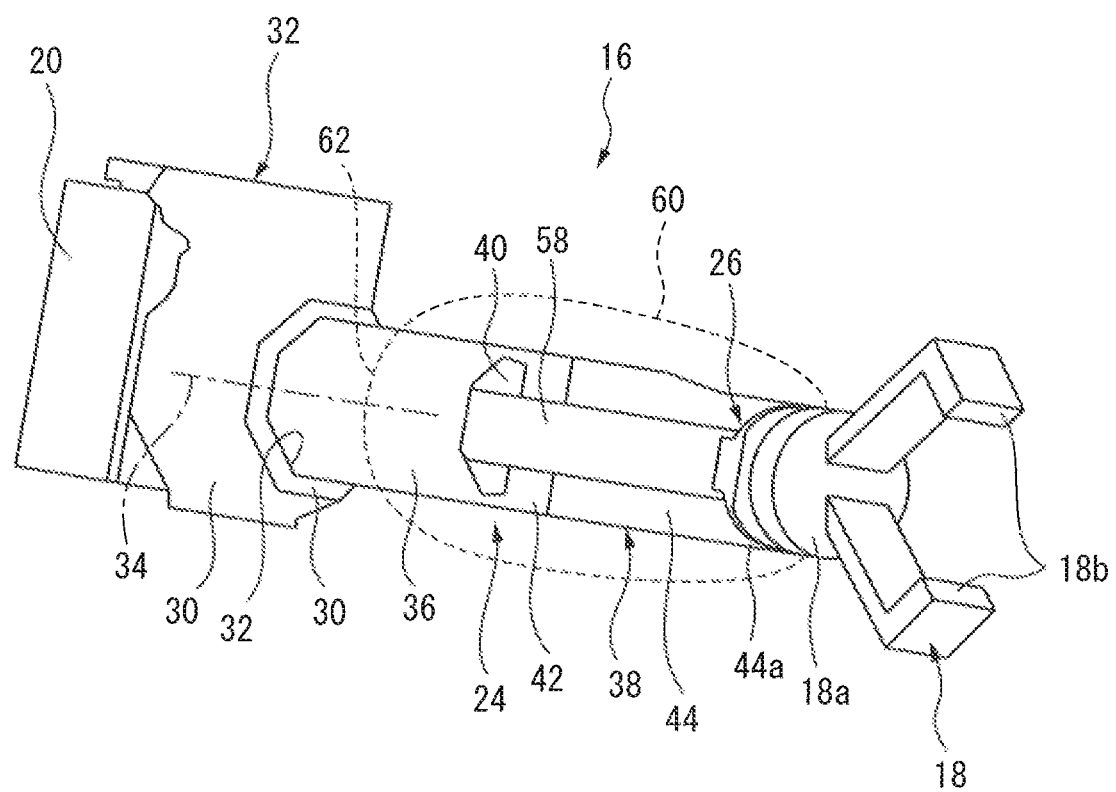
FIG. 3 is a perspective view of the wrist and the end effector of the robot shown in FIG. 2 when viewed from a direction different from FIG. 2.

Further, in the embodiment shown in FIG. 2 to FIG. 4, the open end 64 of the cover 60 is arranged between the distal end 28a of the third movable element 28 and the end effector 18.

However, the open end 64 of the cover 60 may be arranged between the proximal end 48a of the hollow part 48 of the second movable element 26 and the distal end 48b of the hollow part 48 so as to surround an outer surface of the hollow part 48.

In other words, the cover 60 may be mounted on the wrist 16 so as to surround the components of the wrist 16 and the wire member 58 at the area between the through hole 40 of the first movable element 24 and the through hole 54 of the second movable element 26.

In this case as well, the wire member 58 exposed to the outside between the through hole 40 of the first movable element 24 and the through hole 54 of the second movable element 26 can be protected from foreign substances such as a cutting fluid by the cover 60.

Although the invention has been described with reference to the embodiments of the invention, the above-described embodiments do not limit the scope of the invention described in Claims. Modes in which the characteristic described in the embodiments of the invention are combined may be included in the technical scope of the invention. However, all of these combinations are not necessarily essential for solving the problem of the invention. It will be apparent for those skilled in the art that further various modifications and improvements may be added to the embodiments described above.

The invention claimed is:

1. A robot comprising:
a robot arm;
a wrist including a casing connected to a distal end of the robot arm, and including a plurality of movable elements movably connected to each other, each of the movable elements being hollow;
an end effector connected to a distal end of the wrist;
a wire member laid so as to extend through the respective movable elements such that, between hollow parts of two of the moveable elements connected to each other, a portion of the wire member is exposed to the outside of the hollow parts; and
a cover having a first end mounted in a gap between the wrist and the end effector, and a second end mounted on the wrist a distance away from the casing so as to surround a connection between the two of the movable elements and surround the exposed portion of the wire member, without surrounding the casing connecting the wrist to the robot arm.

2. The robot according to claim 1, wherein the wrist includes:
a first movable element of the plurality of movable elements connected to the distal end of the robot arm so as to be rotatable about a first axis; and
a second movable element of the plurality of movable elements connected to a distal end of the first movable element so as to be rotatable about a second axis orthogonal to the first axis,
wherein the cover surrounds the connection between the first movable element and the second movable element.

3. The robot according to claim 2,
wherein the first movable element includes:
a first hollow part connected to the distal end of the robot arm so as to be rotatable about the first axis; and
a first extension part extending from the first hollow part,
wherein the second movable element includes:
a second hollow part; and
a second extension part extending from the second hollow part and connected to a distal end of the first extension part so as to be rotatable about the second axis,
wherein the wire member is laid so as to extend through the first hollow part and the second hollow part,
wherein the cover extends between the first hollow part and the second hollow part so as to surround the connection between the first extension part and the second extension part and the wire member extending between the first hollow part and the second hollow part.

4. The robot according to claim 2, wherein the wrist further includes a third movable element connected to the second movable element so as to be opposite to the first movable element and to be rotatable about a third axis orthogonal to the second axis,
wherein the end effector is fixed to a distal end of the third movable element,
wherein the cover surrounds the connection between the second movable element and the third movable element.

5. The robot according to claim 1, further comprising a first seal member which liquid-tightly seals the inside of a movable element of the plurality of movable elements through which the wire member extends.

6. The robot according to claim 1, wherein the end effector includes a hole which receives the wire member extending out from a movable element of the plurality of movable elements,
wherein the robot further comprises a first seal member which liquid-tightly seals the hole.

* * * * *